(12) United States Patent
Sugata (10) Patent No.: US 6,267,610 B1
(45) Date of Patent: Jul. 31, 2001

(54) STRUCTURE FOR MOUNTING A CABLE REEL AND TURN INDICATOR SWITCHES ONTO A STEERING SHAFT

(75) Inventor: Shouichi Sugata, Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/594,032

(22) Filed: Jun. 15, 2000

(30) Foreign Application Priority Data

Jun. 16, 1999 (JP) .................................................. 11-170323

(51) Int. Cl.[7] .............................. H01R 3/00; H01R 39/00
(52) U.S. Cl. ................................................ 439/164; 439/15
(58) Field of Search ..................................... 439/164, 488, 439/15, 564; 74/473.31; 180/426; 200/61.54, 453

(56) References Cited

U.S. PATENT DOCUMENTS 5,747,763 * 5/1998 Uchiyama et al. ............... 200/61.54
5,971,782 10/1999 Masuda .
6,053,742 * 4/2000 Matsumoto et al. .................... 439/15

* cited by examiner

*Primary Examiner*—Brian Sircus
*Assistant Examiner*—Chandrika Prasad
(74) *Attorney, Agent, or Firm*—Greenblum & Bernstein, P.L.C.

(57) ABSTRACT

There is provided a simplified structure for mounting a cable reel and turn indicator switches onto a steering shaft. The structure includes three or four generally L-shaped first stays extending from the steering shaft and arranged at a given interval in the circumferential direction of the shaft, whereby the cable reel is fitted into the first stays. The structure further includes two second stays, respectively arranged at a given interval between two first stays and extending substantially perpendicularly from the steering shaft. The structure further includes third stays extending from the cable reel fitted into the first stays and arranged in substantially parallel relation over the length of the second stays, whereby turn indicator switches are fitted between the second stays and the third stays.

22 Claims, 6 Drawing Sheets

STRUCTURE FOR MOUNTING A CABLE REEL AND TURN INDICATOR SWITCHES ONTO A STEERING SHAFT

BACKGROUND OF THE INVENTION

1. Field of the Invention

The present invention relates to a structure for mounting a cable reel and turn indicator switches onto a steering shaft in automobiles. The structure of the invention allows, inter alia, to obviate the need for equipment hitherto considered essential. It therefore simplifies the construction of automobiles fittings and improves fitting process efficiency. In this technical field, the turn indicator switches are also known as winker- or blinker-lighting switches.

2. Description of Background Information

Figure 1:
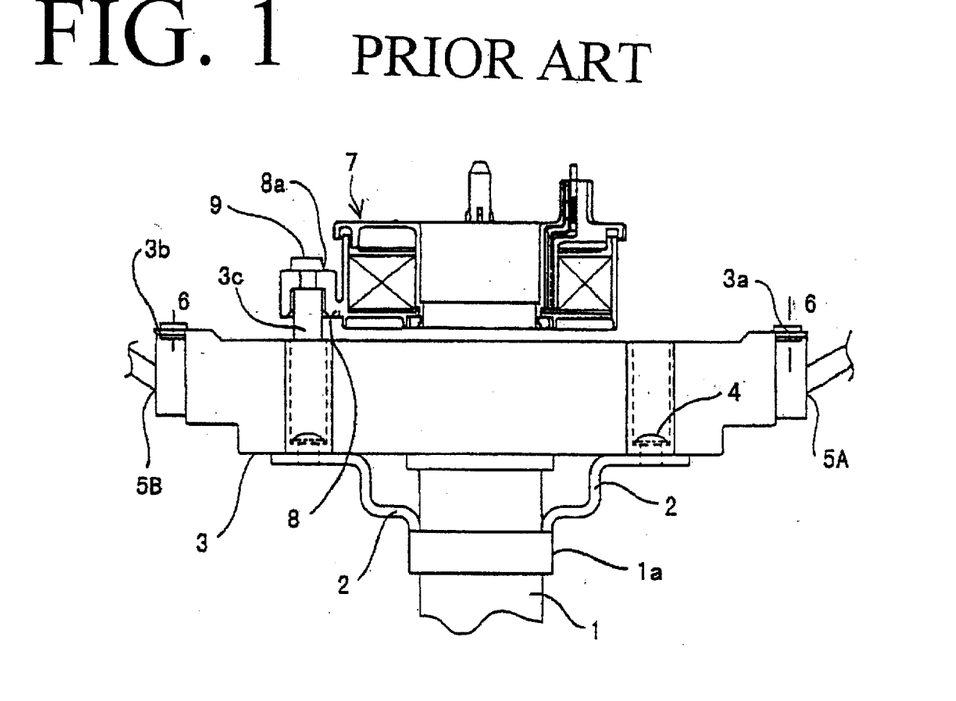
FIG. 1 is a elevational side view of a prior art steering shaft structure, with hidden portions partially in phantom.
Figure 2:
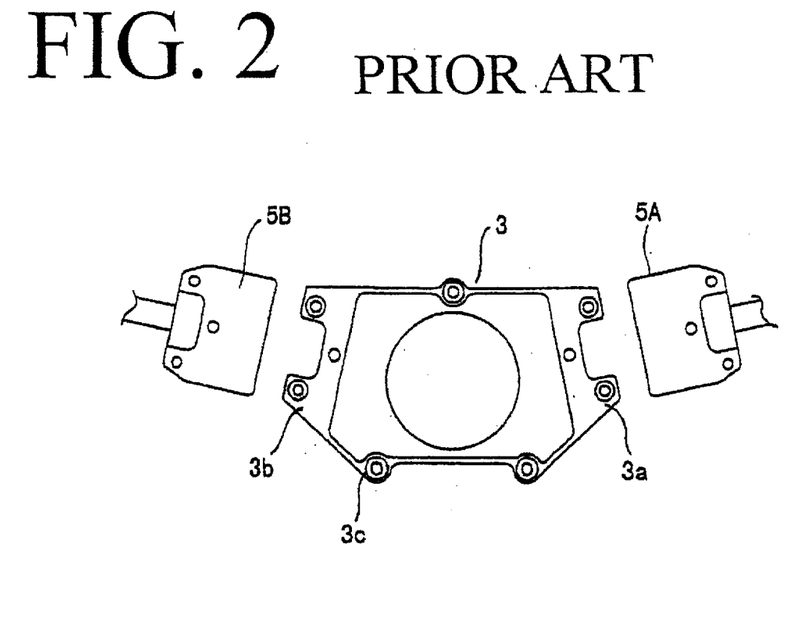
FIG. 2 is an exploded view of a switch body and turn indicator switches known in the prior art.
Figure 3:
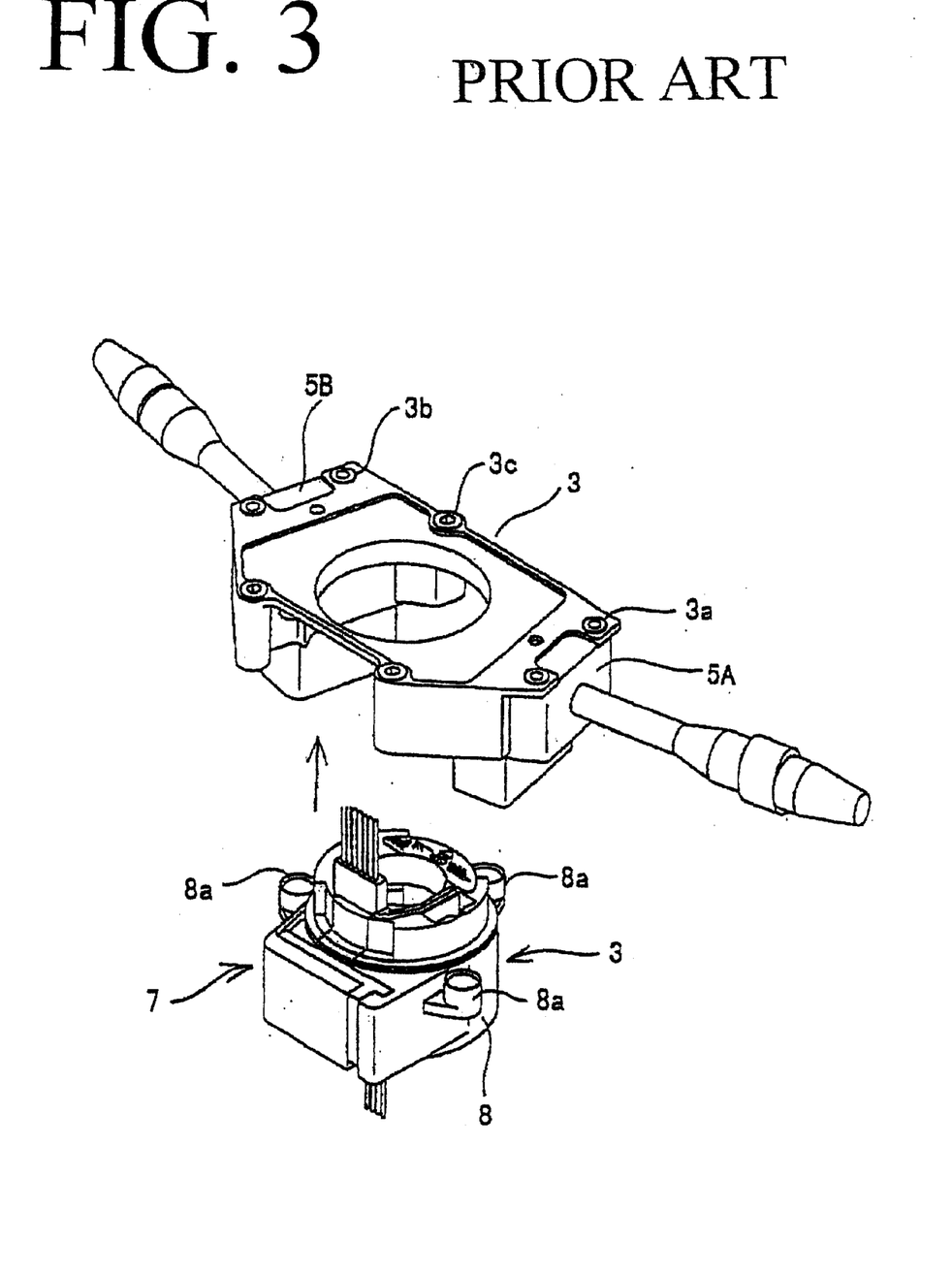
FIG. 3 is a perspective view of a cable reel, and turn indicator switches attached to a switch body, both known in the prior art.

FIGS. 1 to 3 show a known structure for mounting a cable reel and turn indicator switches onto a steering shaft. Such a steering shaft 1 includes an outer tube (tubular ring) 1a at the end where the steering wheel is fitted. An edge of the tubular ring 1a is bonded to three or four stays 2 by welding. These stays 2 are arranged at a given interval in the circumferential direction. The switch body 3 is then fixed onto the stays 2 by first bolts 4. The diametrically opposing sides of the switch body 3 are then provided with a corresponding lighting switch holder 3a or 3b, into which a turn indicator switch 5A or 5B is laterally inserted. The corresponding lighting switch holder 3a or 3b and turn indicator switch 5A or 5B are then clamped by second bolts 6. Further, the upper side (as shown in FIG. 1) of the switch body 3 includes three or four projecting cable reel holders 3c which are arranged at a given interval in the circumferential direction of the switch body 3. The cable reel 7 includes corresponding holder portions 8a extending horizontally from the base of its fixed element 8. Subsequently, the holder portions 8a are clamped onto the cable reel holders 3c by third bolts 9.

In the prior art techniques mentioned above, a switch body 3 is first fixed on stays 2 projecting from a steering shaft 1 by means of first bolts. The turn indicator switches 5A and 5B are then fixed to the switch body 3 by second bolts, while a cable reel 7 is fixed to the switch body 3 by third bolts. In such a construction, bolt-fixing sites amount to about ten, and may downgrade the precision in their mutual positioning.

Moreover, such a structure must employ a number of bolts, e.g., for fixing the switch body 3. It also calls for many fittings or fixtures, adding to material costs. Furthermore, the high number of bolts increases the number of screwing steps, further raising production costs.

In view of the above, a main object of the invention is to provide a fitting structure in which the number of fittings and bolt-fixing sites is reduced, so that productivity of car parts assemblies is improved, and production costs are reduced.

SUMMARY OF THE INVENTION

To this end, there is provided a structure for mounting a cable reel and turn indicator switches onto a steering shaft. The structure includes three or four substantially L-shaped first stays extending from the steering shaft and arranged at a given interval in the circumferential direction of the shaft. The cable reel then engages the first stays. The structure further includes two-level stays which form a space therebetween, whereby the turn indicator switches are fitted into the space.

Preferably, the two-level stays include two second stays which are arranged respectively between two first stays and extend substantially perpendicularly from the steering shaft. They also include corresponding third stays which extend from the cable reel and are arranged in substantially parallel relation over the length of the second stays, whereby the turn indicator switches are fitted into a space between the second stays and the third stays.

Preferably yet, the two-level stays include two second stays arranged respectively between two first stays. Each of the second stays then includes a first support which extends substantially perpendicularly from the steering shaft, and a second support which initially extends perpendicularly from the first support, then in parallel relation over the length of the first support, whereby the turn indicator switches are fitted into a space between the first support and the second support.

The turn indicator switches may respectively include a first face and a second face, the first face including a first protrusion with a first recess, with the second face including a second protrusion with a second recess. The first recess thus engages with the second stays, while the second recess engages with the third stay. The turn indicator switches and the steering switches and the steering shaft are then fixed by a fixing device.

Likewise, the turn indicator switches respectively include a first face and a second face, the first face including a first protrusion with a first recess, with the second face including a second protrusion with a second recess. The first recess thus engages with the first support, while the second recess engages with the second support. The turn indicator switches and the steering shaft are then fixed by a fixing device.

In a preferred embodiment, the cable reel and the first stays are held by a holding device.

In such a case, the first stays includes respectively a vertical portion extending in parallel relation over the length of the steering shaft, the vertical portion having an internal circular face and a substantially median section thereon. The holding device then includes stoppers, which extend from the median section of the internal circular face towards the cable reel.

Alternatively, the cable reel may include an external circular face, whereas the first stays may include an internal circular face. The holding device then includes a pair of complementary locking devices respectively provided on the external circular face of the cable reel and on the internal circular face of the first stays.

As mentioned above, the present invention obviates the need for a switch body which was considered as an essential part of the steering shaft structure. The cable reel and the turn indicator switches are thus directly fitted onto the stays extending from the steering shaft. In other words, the first stays serve not only for fitting with the cable reel, but also for fixing the turn indicator.

The third stays extend from the cable reel fitted with the first stays. The second stays extend from the steering shaft. The turn indicator switches are then fitted between the third stays and the second stays. In such a configuration, the cable reel is fixed not only with the steering shaft, but also with the turn indicator switches, by virtue of the first stays. The position of the cable reel can thus be properly adjusted, so that the precision of its fixture position is improved. Likewise, the turn indicator switches are fixed not only with the steering shaft, but also with the cable reel, by virtue of the second stays. The position of the turn indicator switches can thus be properly adjusted, so that the precision of its fixture position is improved.

As mentioned above, the turn indicator switches and the steering shaft may be fixed by a fixing device. However, when stays are press-fitted into the recesses, use of the fixing device is not necessarily required.

Further, the cable reel and the first stays are fixed without using bolts, and likewise for the turn indicator switches and the second and third stays. Consequently, about ten bolting sites, otherwise thought necessary, are obviated. Accordingly, the mounting process is greatly simplified.

Furthermore, as there is no longer any need for a switches body, the steering shaft structure is rendered lighter, and can be miniaturized.

In a variant second embodiment, a pair of complementary locking devices are provided on the external circular face of the cable reel and on the first stays, so that the cable reel and the first stays are fixed by locking. They are then fixed with a fixing device. In this embodiment, the turn indicator switches respectively include a first face and a second face, the first face including a first protrusion with a first recess, and the second face including a second protrusion with a second recess. The first recess thus engages with the first support, while the second recess engages with the second support. The turn indicator switches and the steering shaft are then fixed by a fixing device.

The present embodiment requires no switch body, as in the first embodiment. The number of fittings or parts is thus reduced. Consequently, the structure is miniaturized, and assembling processes are simplified.

BRIEF DESCRIPTION OF THE DRAWINGS

The above and the other objects, features and advantages of the present invention will be made apparent from the following description of the preferred embodiments, given as non-limiting examples, with reference to the accompanying drawings, in which.

DETAILED DESCRIPTION OF THE PREFERRED EMBODIMENTS

Embodiments of the present invention are described hereinafter with reference to the drawings.

FIGS. 4A to 7B show a first embodiment of the present invention. An outer tube 10a is fixed to the steering wheel receiving side of the steering shaft 10. Four first stays 11, for example, arranged at an interval of 90° in the circumferential direction of the steering shaft are then suitably bonded to an edge (upper side in FIG. 4) of the outer tube 10a, for example, by welding. Further, two second stays 12 (12A and 12B) are suitably bonded, for example, by welding, respectively between two diametrically opposing first stays 11.

Figure 4A:
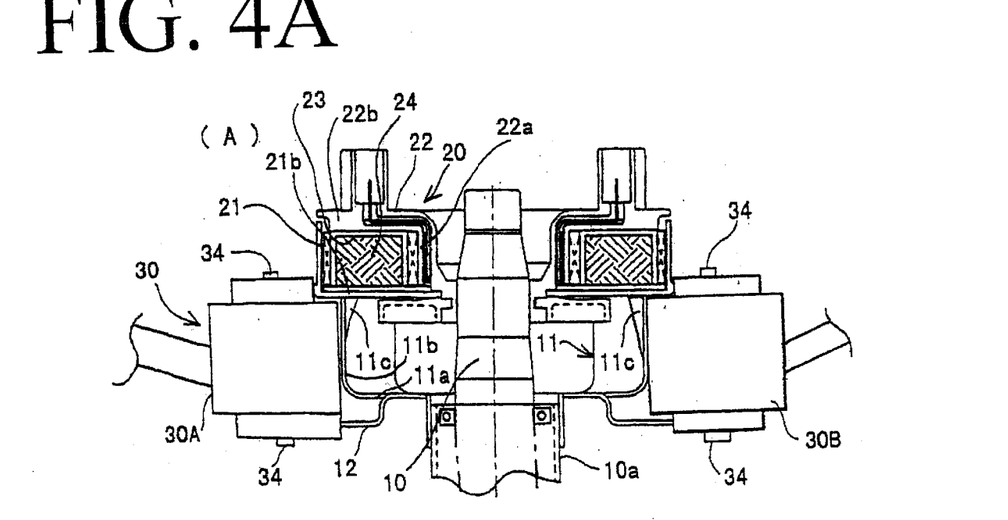
FIG. 4A is a cross-sectional side view of a steering shaft structure according to a first embodiment of the invention, in which first stays are offset by 45° with regard to switch boxes.
Figure 4B:
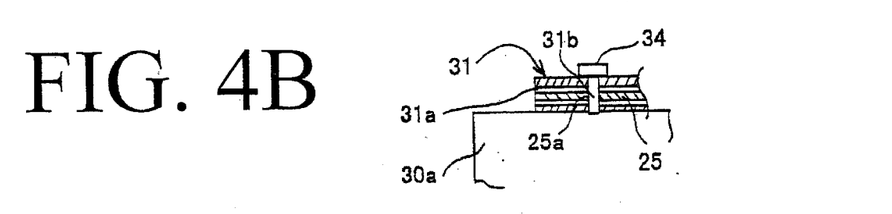
FIG. 4B is a cross-sectional view showing a partially enlarged portion of the steering shaft structure of FIG. 4A.
Figure 5:
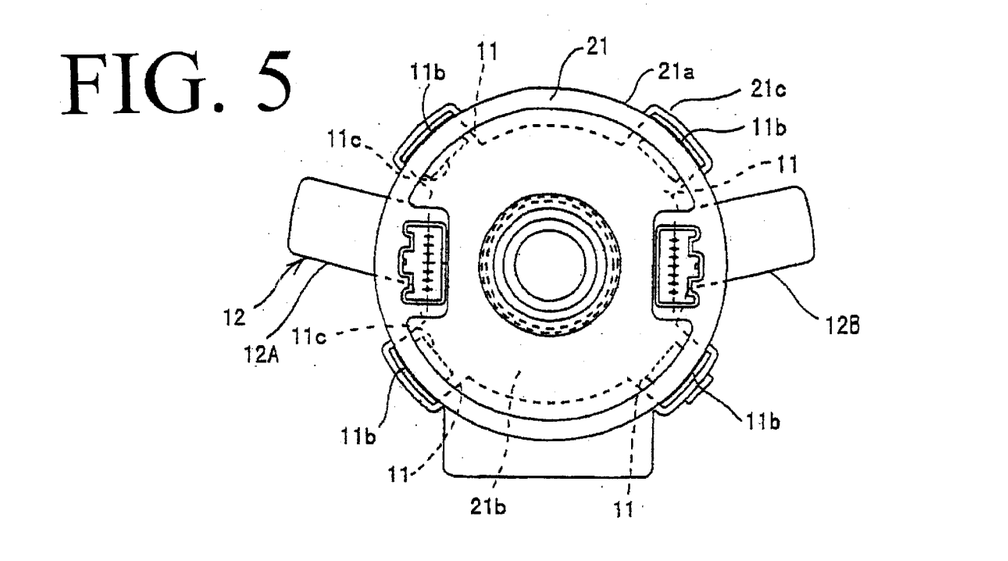
FIG. 5 is a top plan view of a horizontal cross-section of a steering shaft equipped with a cable reel, according to the first embodiment of FIG. 4A.
Figure 6:
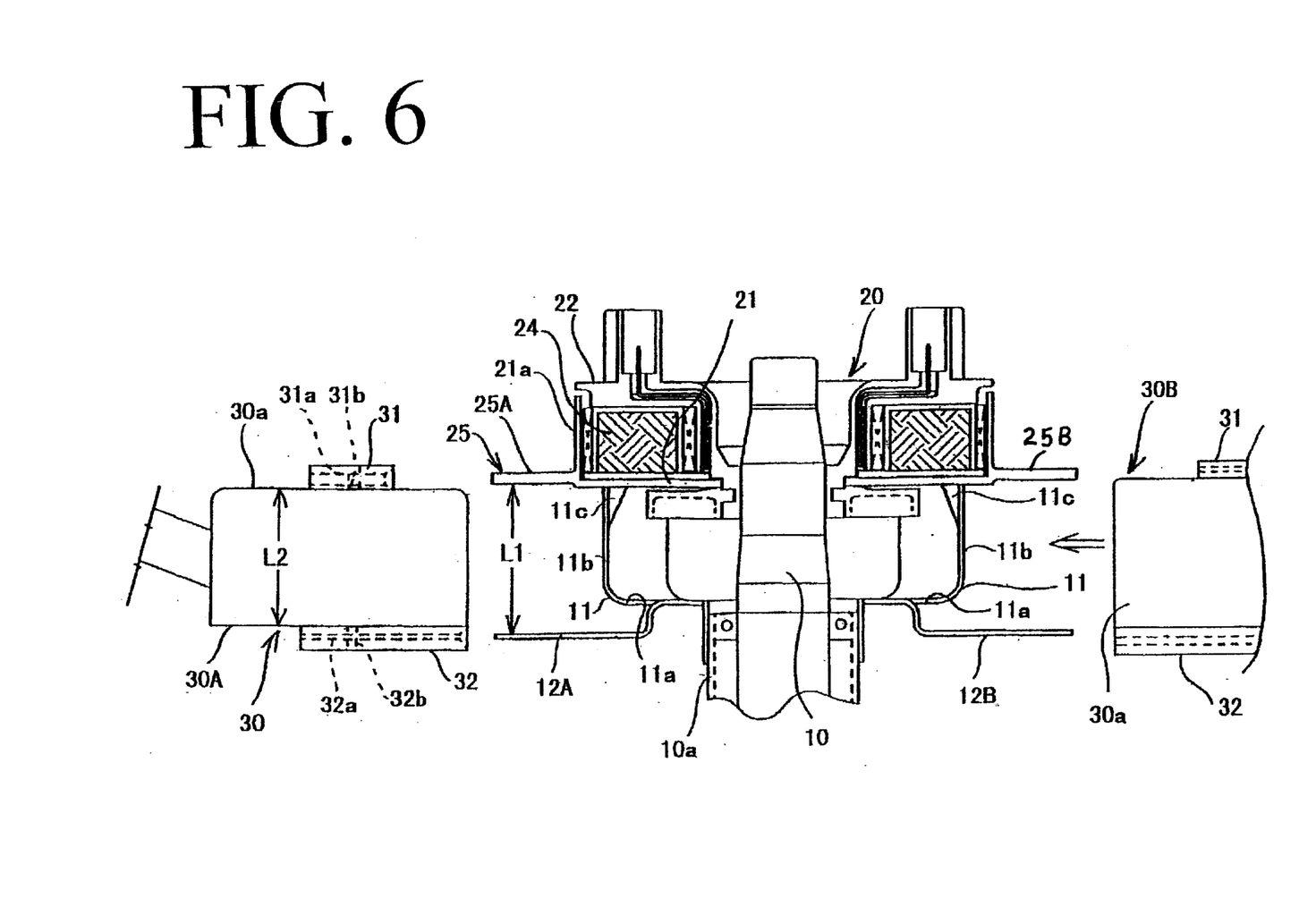
FIG. 6 is a cross-sectional side view showing how turn indicator switches are mounted onto a steering shaft.
Figure 7A:
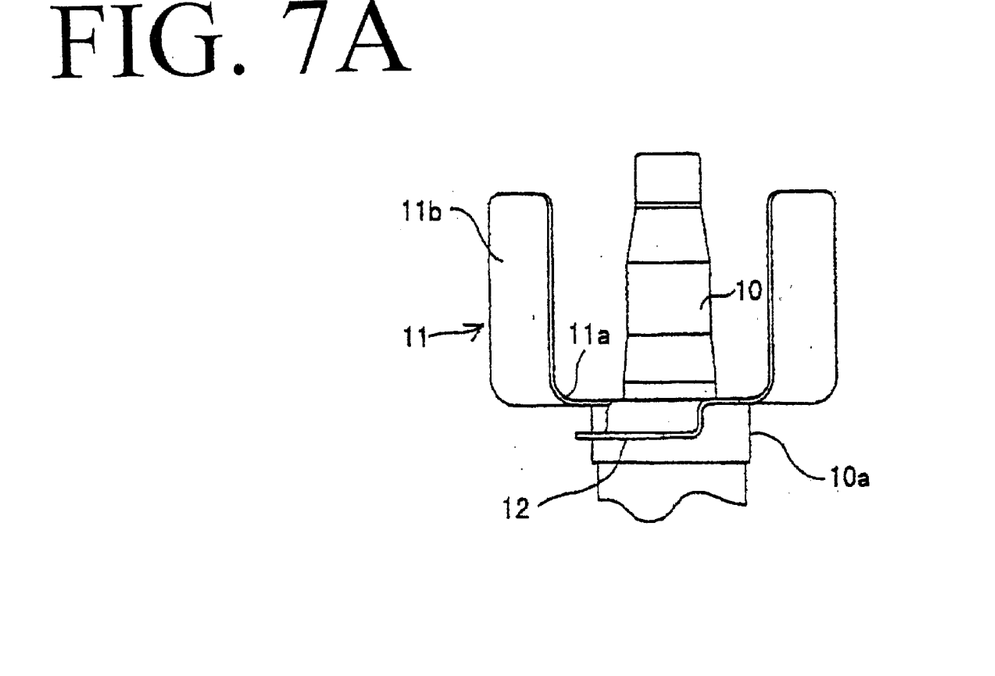
FIG. 7A is a side elevational view of a steering shaft.
Figure 7B:
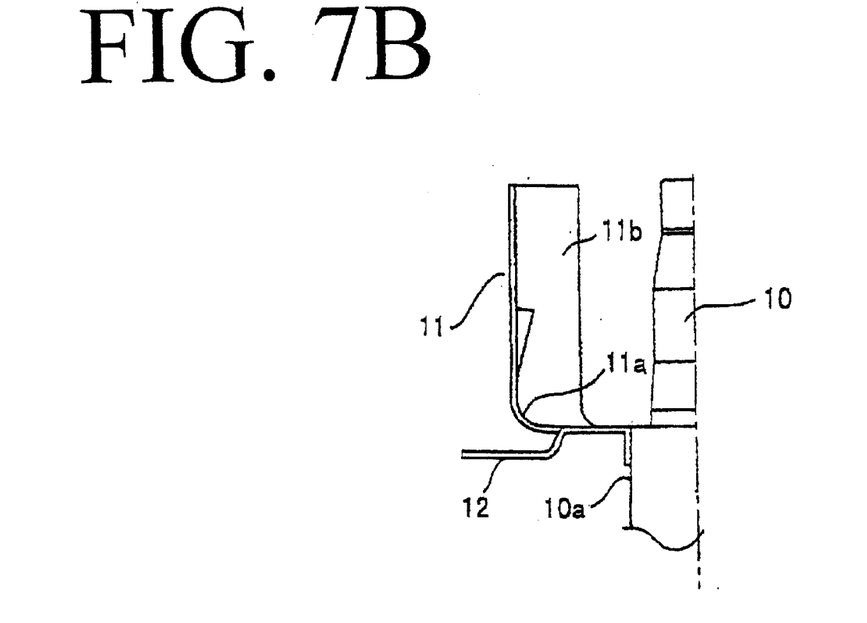
FIG. 7B is a partial cross-sectional view of the steering shaft of FIG. 7A, viewed from a different angle.

The first stays 11 are formed to have a generally L-shaped configuration, respectively, including a horizontal base portion 11a, and a vertical portion 11b projecting upwardly from the horizontal base portion (FIG. 4A). The edge of the horizontal base portion 11a is fixed to the outer tube 10a. The horizontal crosssection of the respective vertical portions 11b forms a circular arc having a large curvature. By comparison, a cable reel 20 has a cylindrical shape. It includes a fixed element 21 having an outer circular wall 21a with an external and internal circular face, and a base wall 21b (FIGS. 4A and 5). When a cylindrical cable reel 20 is mounted onto the steering shaft 10, the respectively vertical portions 11b of the stays 11 engage with the external face of the outer circular wall 21a of the fixed element 21. Further, stoppers 11c may be provided at a radially inward side of the vertical portions 11b of the stays 11. The stoppers 11c project upwardly from a substantially median section on the internal circular face of the vertical portions 11b. The stoppers 11c abuts against the base wall 21b of the fixed element 21 of cable reel 20 from its underside, and define the fitting position of the cable reel 20.

In addition to the fixed element 21, the cable reel 20 includes a mobile element 22 mounted to the steering wheel receiving side. The fixed element 21 includes a base wall 21b having a flat ring shape, and an outer circular wall 21a. By contrast, the mobile element 22 includes an inner circular wall 22a, and a top wall 22b having a flat ring shape. The mobile element 22 is then assembled with the fixed element 21 in a freely rotatable way, thereby forming a torus shaped device 23. A flat electrical cable is stored in a helically wound condition inside the toroidal device 23.

The base wall 21b of the fixed element 21 is provided with a pair of opposing third stays 25 (25A and 25B) extending radially outwardly from the base wall 21b of the cable reel 20.

Likewise, the first stays 11 may be extended along the outer circular wall 21a of the cable reel 20, and the top side of this outer circular wall 21a may be provided with locking devices, e.g., U-shaped detents 21c, into which the extended first stays 11 are fitted.

The two second stays 12A and 12B are provided on the outer tube 10a of the steering shaft 10, and extend outwardly in a substantially radial direction thereof. Further, the third stays 25 are provided on the cable reel 20 fitted with the first stays 11, and extend parallel over the second stays 12A and 12B and spaced a distance L1 therefrom. The distance L1 is sufficiently large enough for the interposition of the switch boxes 30a of the turn indicator switches 30 (30A and 30B).

The turn indicator switches 30A and 30B of the invention are arranged at substantially opposing sides of the steering shaft, and include a switch box 30a, respectively. The switch boxes 30a further include, respectively, a first (e.g., bottom) protrusion 32 with a first recess 32a at its first (e.g., bottom) side, and a second (e.g., top) protrusion 31 with a second recess 31a at its second (e.g., top) side. The bottom and top protrusion 32 and 31 further include a first (bottom) hole 32b and a second (top) hole 31b, respectively. Moreover, each of the third stays 25 and second stays 12 includes a third-stay hole 25a and a second-stay hole 12a (equivalent to 25a of FIG. 4B, but not shown in the figures), respectively. Accordingly, when the third stays 25 are fitted with the second recesses 31a, snap bolts 34 can be clamped through the third-stay holes 25a and second hole 31b. Likewise, when the second stays 12 are fitted with the first recesses 32a, other snap bolts 34 can be clamped through the second-stay holes 12a (see supra) and first hole 32b.

In this configuration, the cable reel 20 engages with the first stays 11 from the top side (of FIG. 4A) along the steering shaft 10. When locking devices, e.g., U-shaped detents 21c are provided, each of the first stays 11 is inserted thereinto. The cable reel 20 is abutted against the stoppers 11c, and stays there. At this stage, the cable reel 20 is fitted onto the first stays 11, so that the third stays 25 projecting from the cable reel 20 face the second stays 12.

The switch box 30a for the turn indicator switch 30A is then inserted from the left-hand side (FIG. 4A) into the space between the third stay 25A and the second stay 12A. The third stay 25A thus fits into the third-stay recess 31a in the second protrusion 31, while the seconds stay 12A fits into the second-stay recess 32a in the first protrusion 32. The switch box 30a stops at the position where the second hole 31b is superposed over the third-stay hole 25a (FIG. 4B), and the first hole 32b is superposed with the second-stay hole 12c (FIG. 5). The snap bolts 34 are then fastened inside the holes, so that the switch box 30a and the turn indicator switch 30A are fixed. The turn indicator switch 30B at the right-hand side is likewise installed between the third stay 25B and the second stay 12B.

In the first embodiment, the cable reel 20 is mounted onto the steering shaft 10, while being fittingly held by the first stays 11. It is also fixed with the turn indicator switches 30 through the third stays 25. In this manner, the cable reel 20 can be placed precisely at a given position. Further, the turn indicator switches 30A and 30B are fixed with the steering shaft 10 through the second stays 12A and 12B. This configuration secures a precise positioning of assembly units.

Figure 8:
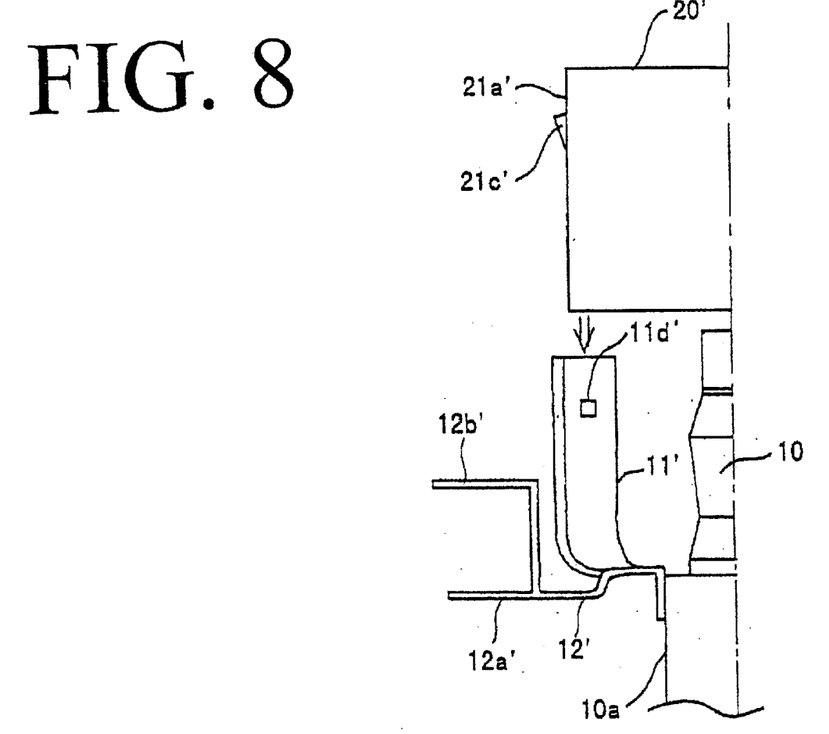
FIG. 8 is a partial cross-sectional side view of a steering shaft according to a second embodiment of the present invention.
Figure 9:
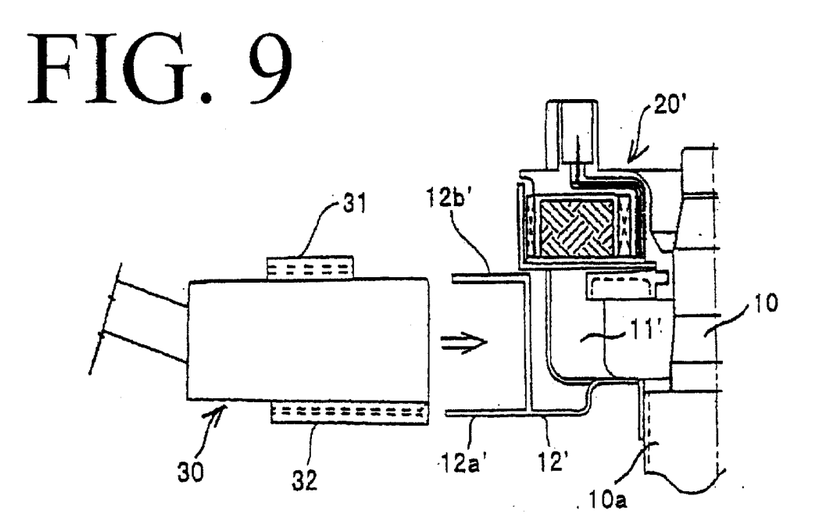
FIG. 9 is a cross-sectional side view of the steering shaft of FIG. 8.

FIGS. 8 and 9 show a second embodiment of the invention, which differs from the first embodiment in that a cable reel 20' does not comprise third stays. Instead, the second stays 12' respectively include a first (e.g., bottom) support 12a' which extends from the outer tube 10a in a substantially radial and outward direction, and a second (e.g., top) support 12b' which projects from a part of the first support along the steering shaft 10, then extends in a parallel relation over the length of the first support 12a'. The turn indicator switch 30 is then fitted into a space between the first support 12a' and the second support 12b'.

As a variant, the first stays 11' and the cable reel 20' may be joined by locking devices. In this embodiment, the external circular face 21a' of the fixed element of the cable reel 20' is provided with a locking hook 21c', whereas the first stays 11' are provided with a locking recess 11d', so that when the cable reel 20' is inserted into the first stays 11', the locking hooks 21c' engage with the locking recesses 11d'. As the cable reel 20' is held by the locking devices, the first stays according to the second embodiment may not include a stopper. The other constructional parts are the same as those of the first embodiment. The same reference numerals are therefore used for both embodiments.

In the second embodiment, the cable reel 20' is fitted onto the first stays 11', whereas the turn indicator switches 30 are fitted with the second stays 12' Accordingly, the order of mounting the cable reel 20' and the turn indicator switches 30 onto the steering shaft 10 may be chosen freely.

As a further variant, no outer tube need be mounted around the steering shaft, and the stays extend directly from the steering shaft. Further, instead of four first stays, there may be provided only three first stays to be fitted with the cable reel. Furthermore, the turn indicator switches need not include the protrusions carrying stay-fitting recesses. Instead, the switch boxes for turn indicator switches may be clamped, directly by bolts, with the second and third stays, or with the first and second supports of the second stays. Further yet, the stays may be fitted into the stay-fitting recesses by press-fitting or locking, thereby obviating the need for bolting processes.

As described above, the present invention makes it possible to obviate the need for switch body, which was hitherto considered to be necessary for mounting a cable reel and turn indicator switches onto a steering shaft. Moreover, bolt-fixing sites are radically reduced, so that the number of fittings or parts is greatly decreased, and process steps are simplified. Consequently, by dispensing with the switch body, the weight of the assembled structure is made lighter, and the entire structure is miniaturized.

Further yet, the reduction of the bolt-fixing sites improves the positioning precision. In particular, in the inventive structure, the cable reel is first mounted onto the first stays fixed with the steering shaft. The turn indicator switches are then fixed by way of the third stays extending from the cable reel and the second stays extending from the steering shaft. By virtue of this configuration, the position of the cable reel and that of turn indicator switches are adjusted relative to each other, so that positioning precision is improved.

Although the invention has been described with reference to particular means, materials and embodiments, it is to be understood that the invention is not limited to the particulars disclosed and extends to all equivalents within the scope of the claims.

The present disclosure relates subject matter contained in priority Japanese Application No. HEI 11-170323, filed on Jun. 16, 1999, which is herein expressly incorporated by reference in its entirety.

What is claimed is:

1. A structure for mounting a cable reel and at least one turn indicator switch onto a steering shaft, said structure comprising:

a plurality of generally L-shaped first stays extending from the steering shaft and arranged at a given interval in the circumferential direction of the shaft, whereby the cable reel engages with said first stays; and at least one set of axially spaced apart mounting stays which form a space therebetween, whereby the at least one turn indicator switch is mountable into said space.

2. The structure according to claim 1, wherein said set of mounting stays comprises at least one second stay arranged respectively between two first stays and extending substantially perpendicularly from said steering shaft, on the one hand, and at least one corresponding third stay which extends from the cable reel and is arranged in substantially parallel relation over the length of said at least one second stay on the other hand, whereby the at least one turn indicator switch is fitted into a space between said at least one second stay and said at least one third stay.

3. The structure according to claim 1, wherein said set of mounting stays comprises at least one second stay arranged respectively between two first stays, and said at least one second stay comprises a first support which extends substantially perpendicularly from the steering shaft, and a second support which initially extends perpendicularly from a part of said first support, and in parallel relation over the length of said first support, whereby the at least one turn indicator switch is fitted into a space between said first support and said second support.

4. The structure according to claim 2, wherein each turn indicator switch includes a first face and a second face, said first face including a first protrusion with a first recess, and said second face including a second protrusion with a second recess, wherein said first recess engages with said second stay, while said second recess engages with said third stay, and wherein said at least one turn indicator switch and the steering shaft are fixed by a fixing device.

5. The structure according to claim 3, wherein each turn indicator includes a first face and a second face, said first face including a first protrusion with a first recess, said second face including a second protrusion with a second recess, wherein said first recess is engagable with said first support, while said second recess is engagable with said second support, and wherein said at least one turn indicator switch and the steering shaft are fixed by a fixing device.

6. The structure according to claim 1, wherein said cable reel and said first stays are held by a holding device.

7. The structure according to claim 2, wherein said cable reel and said first stays are held by a holding device.

8. The structure according to claim 3, wherein said cable reel and said first stays are held by a holding device.

9. The structure according to claim 4, wherein said cable reel and said first stays are held by a holding device.

10. The structure according to claim 5, wherein said cable reel and said first stays are held by a holding device.

11. The structure according to claim 6, wherein each said first stay comprises respectively a vertical portion extending in parallel relation over the length of said steering shaft, said vertical portion having an internal circular face and a substantially median section thereon, and wherein said holding device comprises stoppers which extend from said median section of said internal circular face towards said cable reel.

12. The structure according to claim 7, wherein each said first stay comprises respectively a vertical portion extending in parallel relation over the length of said steering shaft, said vertical portion having an internal circular face and a substantially median section thereon, and wherein said holding device comprises stoppers, which extend from said median section of said internal circular face towards said cable reel.

13. The structure according to claim 8, wherein each said first stay comprises respectively a vertical portion extending in parallel relation over the length of said steering shaft, said vertical portion having an internal circular face and a substantially median section thereon, and wherein said holding device comprises stoppers, which extend from said median section of said internal circular face towards said cable reel.

14. The structure according to claim 9, wherein each said first stay comprises respectively a vertical portion extending in parallel relation over the length of said steering shaft, said vertical portion having an internal circular face and a substantially median section thereon, and wherein said holding device comprises stoppers, which extend from said median section of said internal circular face towards said cable reel.

15. The structure according to claim 10, wherein each said first stay comprises respectively a vertical portion extending in parallel relation over the length of said steering shaft, said vertical portion having an internal circular face and a substantially median section thereon, and wherein said holding device comprises stoppers, which extend from said median section of said internal circular face towards said cable reel.

16. The structure according to claim 6, wherein said cable reel includes an external circular face, whereas each said first stay includes an internal circular face, and wherein said holding device comprises a pair of complementary locking devices respectively provided on said external circular face of said cable reel and on said internal circular face of each said first stay.

17. The structure according to claim 7, wherein said cable reel includes an external circular face, whereas each said first stay includes an internal circular face, and wherein said holding device comprises a pair of complementary locking devices respectively provided on said external circular face of said cable reel and on said internal circular face of each said first stay.

18. The structure according to claim 8, wherein said cable reel includes an external circular face, whereas each said first stay includes an internal circular face, and wherein said holding device comprises a pair of complementary locking devices respectively provided on said external circular face of said cable reel and on said internal circular face of each said first stay.

19. The structure according to claim 9, wherein said cable reel includes an external circular face, whereas each said first stay includes an internal circular face, and wherein said holding device comprises a pair of complementary locking devices respectively provided on said external circular face of said cable reel and on said internal circular face of each said first stay.

20. The structure according to claim 10, wherein said cable reel includes an external circular face, whereas each said first stay includes an internal circular face, and wherein said holding device comprises a pair of complementary locking devices respectively provided on said external circular face of said cable reel and on said internal circular face of each said first stays.

21. The structure according to claim 1, wherein said plurality of first stays comprises at least three of said generally L-shaped first stays, and said at least one set of mounting stays comprises at least two sets.

22. A structure for mounting a cable reel and at least one turn indicator switch onto a steering shaft, said structure comprising:
a plurality of generally L-shaped first stays extending from the steering shaft and arranged at a given interval in the circumferential direction of the shaft, whereby the cable reel axially engages with said first stays; and
at least one set of axially spaced apart mounting stays which extend in a direction generally perpendicular to the steering shaft and which form a space therebetween, whereby the at least one turn indicator switch is mountable into said space below the cable reel.

* * * * *